United States Patent

[11] 3,612,467

| [72] | Inventors | Kiyoshi Terai<br>Ashiya-shi;<br>Tatsumi Kurioka, Kobe-shi, both of Japan |
|---|---|---|
| [21] | Appl. No. | 811,050 |
| [22] | Filed | Mar. 27, 1969 |
| [45] | Patented | Oct. 12, 1971 |
| [73] | Assignee | Kawaki Jukogy Kabushiki Kaisha<br>Ikuta-ku, Kobe, Japan |
| [32] | Priority | Apr. 3, 1968 |
| [33] | | Japan |
| [31] | | 43/21978 |

[54] POSITIONING DEVICE FOR STRUCTURAL MEMBERS
2 Claims, 3 Drawing Figs.

[52] U.S. Cl. .................................................. 248/396,
214/1, 214/700
[51] Int. Cl. ......................................................F16m 13/00
[50] Field of Search............................................ 214/1 CM,
1, 512; 248/179, 396

[56] References Cited
UNITED STATES PATENTS

| 2,831,588 | 4/1958 | Seed.............................. | 214/38 (40) |
| 3,215,391 | 11/1965 | Storm............................ | 248/179 X |
| 3,288,421 | 11/1966 | Peterson........................ | 248/179 X |
| 3,310,182 | 3/1967 | Orloff............................ | 214/1 CM |
| 3,374,977 | 3/1968 | Moy................................ | 248/396 X |

*Primary Examiner*—Gerald M. Forlenza
*Assistant Examiner*—Geroge F. Abraham
*Attorney*—Sughrue, Rothwell, Mion, Zinn & MacPeak

ABSTRACT: A positioning device in the form of a steel surface plate is supported by individual supporting means, each capable of raising or lowering the plate and control means to operate the spacing means individually or in various combinations for inclining at various angles to facilitate assembling or welding of structural members carried on the upper surface thereof.

PATENTED OCT 12 1971 3,612,467

POSITIONING DEVICE FOR STRUCTURAL MEMBERS

BACKGROUND OF THE INVENTION

1. Field of the Invention

This invention relates to a positioning device for structural members which are to be assembled and welded into a building structure, and more particularly to an arrangement which involves a plurality of raising and lowering mechanisms for supporting the surface with selective means to control the raising and lowering of the individual mechanisms.

2. Description of the Prior Art

Heretofore, in assembling for instance a plurality of sheet metal members or a plurality of blocks, the blocks were positioned in a desired relationship with the required number of reinforcing elements on a surface plate to build up the overall assembly. However, because of the stationary nature of the conventional positioning device or surface plate, neither the assembly nor the welding of the structural members subsequent to assembly is easy. Various inconveniences are experienced, for instance both as to the accessibility of the bottom portions or bottom surfaces of the structural members and the posture of the workers during assembling and/or welding operations.

SUMMARY OF THE INVENTION

The present invention is directed to a novel construction of a positioning device for the structural members wherein means are provided for mobilization of the surface plate or positioning member to facilitate the assembly and/or welding of the structural members carried thereby. The present invention further provides a novel construction of the positioning device for supporting the structural members as they are assembled, wherein a surface plate forming a portion thereof may be inclined by means of a plurality of raising and lowering means facilitating the assembling and welding of the supported structure with the result that high quality products are obtained.

These objects are accomplished by employing a positioning device for structural members which comprises a surface plate preferably of steel, a plurality of spaced and individually operable supporting means capable of raising and lowering the portion of surface plate in contact therewith, and control means to selectively control the raising and lowering of each of the supporting means in any desired combination or individually as desired. The surface place may be brought into an inclined position at a desired angle and the assembly and/or welding of workpiece forming the structural members on the surface is therefore greatly facilitated. BRIEF DESCRIPTION OF THE DRAWINGS FIG. 1 is a perspective view schematically illustrating one embodiment of the present invention.

DESCRIPTION OF THE PREFERRED EMBODIMENT

Figure 1:
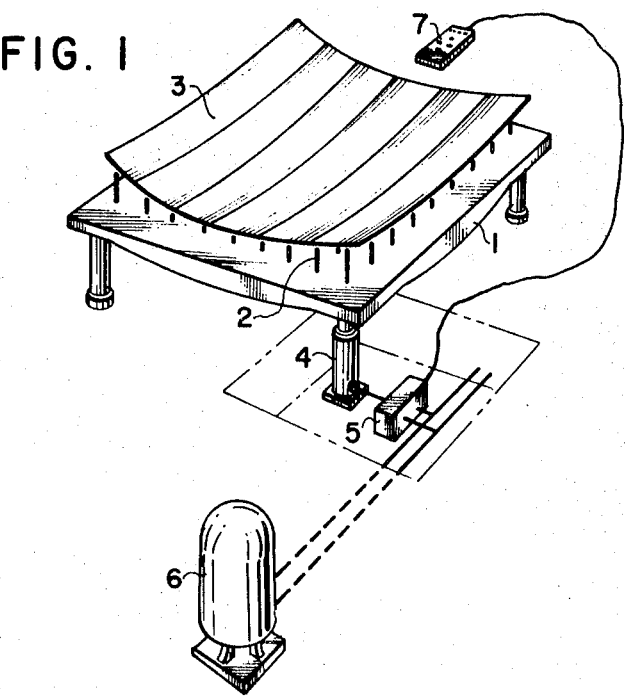

Referring first to FIG. 1, a steel surface plate 1 is provided on which the blocks or plates 3 forming the structural members are assembled. A plurality of barlike jigs 2 are carried on the upper surface of the steel surface plate and support the individual blocks to form the assembly which may subsequently be welded at the junction point. The employment of jigs 2 for supporting the blocks 3 is quite conventional. A plurality of supporting means 4 support the steel surface plate at the four corners thereof, the supporting means 4 may be of the hydraulic type and may comprise conventional reciprocating fluid motors of the piston and cylinder type. A distributor 5 controls the supply and exhaust of pressurized fluid to and from each of the individual supporting means 4. A fluid source is provided at 6 and remote control means 7 control the application and exhaust of pressurized fluid through distributor means 5 to and from cylinders 4 and fluid source 6. These members constitute essentially the components of the positioning device according to the present invention.

Figure 2:
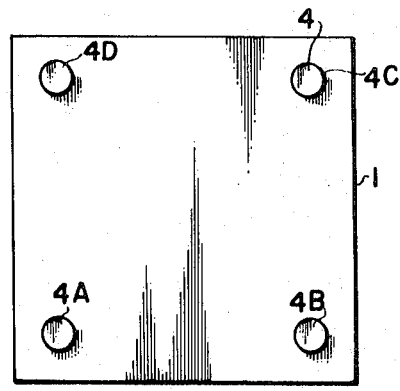
FIG. 2 is a bottom plan of a portion of the apparatus shown in FIG. 1.

FIG. 2 illustrates in a bottom plan view of the steel surface plate 1, the location of each of the supporting means 4 in this case, designated as separate hydraulic-type fluid actuators 4a, 4b, 4c and 4d at the respective four corners of plate 1.

Figure 3:
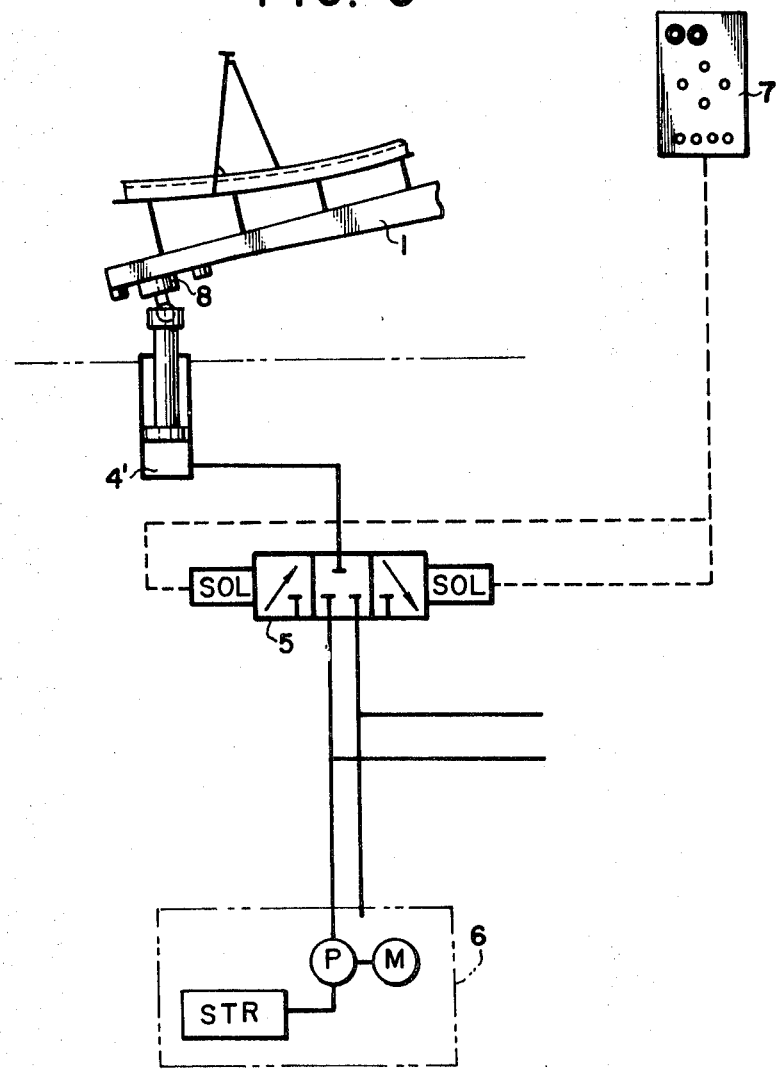
FIG. 3 is an explanatory, diagrammatic view of selective components of the apparatus of FIG. 1 illustrating the operation of the positioning device according to the present invention.

The operation of the positioning device of the present invention may be readily seen by referred to FIG. 3 taken in conjunction with FIG. 2. It will be understood that the surface plate 1 which is supported by the four hydraulic cylinders, constituting the supporting means 4, is selectively raised or lowered under the control of the distributing means 5 which may constitute a fluid flow control valve of the electromagnetic type. Electromagnetic distributor means 5 is in turn controlled by signals issued from the remote control operational panel 7. With greater particularity, each of the component electromagnetic valves of the distributor means 5 which corresponds to one of the four hydraulic cylinders of the supporting means 4, is opened or closed by an electrical signal which emanates from the remote control panel 7. Pressurized fluid from fluid source 6 is therefore supplied to or exhausted from the chamber 4' lying beneath the piston and within the corresponding hydraulic cylinder. The supply or exhaust of pressurized fluid into and out of chamber 4' of the hydraulic cylinder raises or lowers the piston and thus the immediate portion of the surface plate 1 to which the piston is attached thereby raised or lowered.

Since the pushbuttons of the remote control panel 7 are so constructed that the hydraulic cylinders are operated in combinations of 4A–4B, 4C–4D, 4A–4D and 4B–4C (see FIG. 2) the steel surface plate 1 may be tilted in any desired direction and at any desired angle. For instance, if two of the cylinders 4A and 4B or 4C and 4D are simultaneously driven for an equivalent distance, the surface plate is tilted in an up-and-down direction when viewed in FIG. 2 while if two cylinders such as 4A and 4D or 4B and 4C are simultaneously driven for another equivalent distance the surface plate 1 is tilted in a right to leftwise direction when viewing the same Figure.

As shown in FIG. 3, an electromagnet 8 is connected to the upper end of each hydraulic cylinder piston by a universal joint. The electromagnet 8 when energized attracts the steel support thereby attaching itself to the support plate 1 so that the plate is prevented from falling down or sliding when the surface plate 1 is tilted by extension of individual cylinders 4. For this purpose, the electromagnets on the cylinders 4A and 4B are operated when the hydraulic cylinders 4A and 4B or 4C and 4D are operated. Since the electromagnets on cylinders 4C and 4D are not operated at this time, the steel surface plate 1 may readily slide on these electromagnets.

Likewise, when the hydraulic cylinders 4A and 4D, or 4B and 4C are operated, the electromagnets on cylinders 4A and 4D are energized for fixing the steel surface plate thereto and the surface plate is prevented from sliding but are slidable on the electromagnets for cylinders 4B and 4C. It is also possible that a separate supporting point may be provided beneath the center of gravity of the surface plate 1 whereby the sliding of the surface plate 1 against the tilting hydraulic cylinders may be readily prevented.

By the employment of the positioning device of the present invention, the structural members or blocks 3 may be readily assembled on the surface plate under a tilting angle of which is readily adjusted. Since the angle and direction of tilting may be easily varied during the assembling and welding operations, the assembly and welding workers may be situated in a posture which allows relative ease in carrying out of these operations even for structural members of complicated construction and configuration. Furthermore, the surface plate 1 may be fixed in its desired position because two of the neighboring hydraulic cylinders having electromagnets at the upper ends of the pistons are simultaneously operated in succession of the other two hydraulic cylinders.

We claim:

1. A positioning device for structural members comprising: a surface plate, a plurality of supporting means capable of raising or lowering the surface plate at individual, spaced locations, means to control the raising and lowering movement of said supporting means in various combinations, said surface plate being formed of a ferrous material and each of said supporting means including an electromagnet universally coupled to the end of said supporting means in contact with said support plate, and means for selectively energizing said electromagnet; whereby: the surface plate may be brought into a tilted position at any desired angle to facilitate the assembly or welding of structural members carried by said surface plate.

2. The positioning device as claimed in claim 1, wherein said surface plate is formed of steel, said plurality of supporting means comprises four hydraulic cylinders, and said means to control the raising and lowering movement of said supporting means in various combinations includes means for simultaneously operating any two adjacent hydraulic cylinders for movement an equivalent distance, and said means for selectively energizing said electromagnets comprises means for simultaneously energizing the two electromagnets for the respective cylinders being operated or said nonoperated cylinders whereby regardless of which pairs of electromagnets are energized, the surface plate may readily slide on the nonenergized electromagnets.